(12) United States Patent
Ikeya

(10) Patent No.: US 7,213,579 B2
(45) Date of Patent: May 8, 2007

(54) FUEL PUMP AND METHOD OF MANUFACTURING AN ARMATURE FOR THE FUEL PUMP

(75) Inventor: Masaki Ikeya, Obu (JP)

(73) Assignee: Aisan Kogyo Kabushiki Kaisha, Aichi-ken (JP)

( * ) Notice: Subject to any disclaimer, the term of this patent is extended or adjusted under 35 U.S.C. 154(b) by 118 days.

(21) Appl. No.: 10/879,567

(22) Filed: Jun. 29, 2004

(65) Prior Publication Data
US 2005/0013709 A1 Jan. 20, 2005

(30) Foreign Application Priority Data
Jul. 15, 2003 (JP) ............................ 2003-196963

(51) Int. Cl.
*F02M 37/08* (2006.01)
*F02M 37/04* (2006.01)

(52) U.S. Cl. ...................................... 123/497; 310/261
(58) Field of Classification Search ................ 123/497; 417/423.7, 423.1, 410.1, 321; 310/261, 264, 310/266, 267, 268, 269, 40 MM
See application file for complete search history.

(56) References Cited

U.S. PATENT DOCUMENTS

| | | | | |
|---|---|---|---|---|
| 3,790,832 A | * | 2/1974 | Patel | 310/113 |
| 4,074,159 A | * | 2/1978 | Robison | 310/154.25 |
| 4,164,675 A | * | 8/1979 | Sato et al. | 310/268 |
| 4,203,048 A | * | 5/1980 | Sato | 310/268 |
| 5,557,976 A | * | 9/1996 | Moribayashi et al. | 74/7 E |
| 5,687,471 A | * | 11/1997 | Noguchi et al. | 29/598 |
| 6,141,865 A | * | 11/2000 | Kakutani et al. | 29/733 |
| 6,227,822 B1 | * | 5/2001 | Chen | 417/423.7 |
| 6,568,066 B2 | * | 5/2003 | Furuya et al. | 29/598 |
| 6,819,020 B2 | * | 11/2004 | Toya et al. | 310/89 |
| 2001/0038250 A1 | * | 11/2001 | Katagiri et al. | 310/67 R |
| 2001/0038253 A1 | * | 11/2001 | Furuya et al. | 310/269 |
| 2002/0163259 A1 | * | 11/2002 | Ohno et al. | 310/68 C |
| 2002/0190599 A1 | * | 12/2002 | Akabane | 310/232 |
| 2003/0202893 A1 | * | 10/2003 | Moroto et al. | 417/423.7 |
| 2004/0115077 A1 | * | 6/2004 | Iwanari | 417/423.3 |
| 2004/0150280 A1 | * | 8/2004 | Moroto et al. | 310/154.28 |
| 2005/0062351 A1 | * | 3/2005 | Berwert et al. | 310/90 |

FOREIGN PATENT DOCUMENTS

DE 19709777 9/1998

* cited by examiner

*Primary Examiner*—Mahmoud Gimie
(74) *Attorney, Agent, or Firm*—Dennison, Schultz & MacDonald

(57) ABSTRACT

An axial length of the fuel pump is reduced, and the fuel pump is miniaturized, without reducing pumping performance.

A space G is formed between coils 19 and the shaft 7 at the upper side of the core 11, and the lower portion of the commutator 8 is inserted into the space G. As a result, a length B of the commutator 8 and an upwardly projecting length C of the coils 19 can be caused to overlap. Alternatively, a space H is formed between coils 19 and the shaft 7 at the lower side of the core 11, and upper portion of the bearing 10 is inserted into the space H. As a result, a length F of the lower bearing and a downwardly projecting length E of the coils 19 can be caused to overlap. This overlapping allows the distance between the bearings of the shaft to be reduced.

2 Claims, 8 Drawing Sheets

FUEL PUMP AND METHOD OF MANUFACTURING AN ARMATURE FOR THE FUEL PUMP

CROSS REFERENCE TO RELATED APPLICATIONS

The present application claims priority based on Japanese Patent Application 2003-196963 filed on Jul. 15, 2003. The specification and drawings of that Japanese application are hereby incorporated by reference within this application.

FIELD OF THE INVENTION

The present invention relates to a fuel pump for drawing in a fuel such as gasoline etc., increasing the pressure thereof, and discharging the pressurized fuel.

BACKGROUND OF THE INVENTION

FIG. 8 shows a conventional fuel pump. In this fuel pump, a cylindrical housing 104 encloses a pump section 101 and a motor section 102. The motor section 102 is provided with an armature 106 and a magnet 105. FIG. 9 schematically shows a cross-section of the armature 106. The armature 106 is provided with a shaft 107, a core 111 fixed to the shaft 107, coils 119 wound around the core 111, and a commutator 108 for supplying current to the coils 119. In FIG. 9, the commutator 108 is shown as separated from the core 111 and the coils 119. However, the core 111, the coils 119, and the commutator 108 are in fact formed in an integral manner. A pair of bearings 110 and 113 is provided in the vicinity of both ends of the shaft 107, these supporting the shaft 107 in a manner allowing the rotation thereof. The magnet 105 is located so as to surround the armature 106.

As shown in FIG. 8, a lower end of the shaft 107 engages with the pump section 101, thereby rotating the pump section 101.

FIG. 10 shows a cross-sectional view along the line X—X of FIG. 9. A plurality of slots 114 (eight slots in this case) are provided in the core 111, each coil 119 being wound around four slots 114. In this specification, when one coil 119 that has passed a first slot returns to a (1+Y)-th slot, this will be referred to as the coil 119 having been wound around the Y slots. When the coils 19 are wound around four slots 114 in the core 111 that has eight slots, the coils 119 pass the vicinity of the shaft 107. As shown in FIG. 9, the coils 119 project in an axial direction from both axial end faces 11a and 111b of the core 111, and the coils 119 that project from the end faces 111a and 111b make contact with the shaft 107.

SUMMARY OF THE INVENTION

The miniaturization of fuel pumps is in demand. As shown in FIG. 9, the conventional pump has a configuration wherein the shaft 107 is provided with (listing from the top) the upper bearing 113, the commutator 108, the coils 119 that extend further than the core 111 in the axial direction, and the lower bearing 110, these being provided in series. As a result, the length L2 from the upper bearing 113 to the lower bearing 110 must be at least [the length A of the upper bearing 113 + the length B of the commutator 108 + the upwardly projecting length C of the coils 119 + the length D of the core 111 + the downwardly projecting length E of the coils 119 + the length F of the lower bearing 110].

The length of the fuel pump in the axial direction is affected by the length of the armature, and the length of the armature is determined by the length L2 between the bearings 113 and 110 of the shaft 107. To shorten the length of the fuel pump in the axial direction so as to miniaturize the fuel pump, it is necessary to reduce the length in the axial direction of the bearings 113 and 110, of the commutator 108, or of the coils 119. However, reducing these lengths causes a reduction in pump performance. It is difficult to reduce the length L2 between the bearings 113 and 110 without reducing pump performance.

In the present invention, the length in the axial direction of the bearings, the commutator, or the coils is not reduced. Consequently, pump performance is not reduced. The present invention has realized a technique for reducing the distance between the bearings of the shaft without reducing pump performance.

One feature of the fuel pump of the present invention is that a portions of coils projecting in an axial direction from an axial end face of a core are formed at a location separated from a shaft, thus maintaining a space between the shaft and the portions of the coils projecting from the end face of the core, at least at one axial end of the core.

When a space is maintained between the shaft and the portions of the coils projecting from the end face of the core, a bearing can be inserted into this space. Alternatively, a commutator can be inserted into this space.

As was described with reference to FIG. 9, in a conventional armature, the length B of the commutator and the upwardly projecting length C of the coils are both necessary, as are the length F of the lower bearing and the downwardly projecting length E of the coils.

In one example of the present invention, downwardly projecting portion of the coils 119 from the lower end face 111b of the core 111 is formed at a location separated from the shaft 107, thus maintaining a space between the shaft 107 and the downwardly projecting portions of the coils 119, and the lower bearing 110 is inserted into this space. A length F of the lower bearing 110 and the downwardly projecting length E of the coils 119 can thus be caused to overlap, this overlapping allowing a reduction in the distance L2 between the bearings 113 and 110. In the alternative example, upwardly projecting portions of the coils 119 from the upper end face 111a of the core 111 is formed at a location separated from the shaft 107, thus maintaining a space between the shaft 107 and the upwardly projecting portions of the coils 119, and the commutator 108 is inserted into this space. A length B of the commutator 108 and the upwardly projecting length C of the coils 119 can thus be caused to overlap, this overlapping allowing a reduction in the distance L2 between the bearings 113 and 110. Alternatively, the length A of the upper bearing 113 and the upwardly projecting length C of the coils 119 can be caused to overlap by changing the position of the commutator 108.

According to the present invention, the fuel pump can be miniaturized and made lighter without reducing pump performance.

In the most useful example, the length F of the lower bearing and the downwardly projecting length E of the coils is caused to overlap, and the length B of the commutator and the upwardly projecting length C of the coils is also caused to overlap. The distance between the bearings of the shaft can thus be markedly reduced. The fuel pump can effectively be miniaturized and made lighter. The present invention may be practiced at either the upper side or lower side of the coils.

In order to form the space between the shaft and the portions of the coils projecting in the axial direction from the end face of the core, it is preferred that the coils are wound so as to pass around no more than one third of a total number of slots of the core.

By winding the coils in this manner, the coils extend in two directions from one slot, the angle formed by these coils being between 90 degrees and 180 degrees. The smaller the angle, the more closely the coil approaches the shaft. Consequently, by winding the coils in the manner described above, it is possible to have the coils in a location separated from the shaft, thus allowing a cavity to be formed around the shaft. For example, when the core has eight slots and the coils are wound so as to pass around two or one slot(s), the coils do not pass the vicinity of the shaft, thus forming the space around the shaft.

When the armature is to be manufactured, it is preferred that a removable cylindrical jig is attached to the shaft, then coils are wound around the core, and finally the cylindrical jig is removed from the shaft.

By means of this method, an armature that ensures the space around the shaft can be manufactured. There is no restriction on the number of slots that the coils pass over.

PREFERRED EMBODIMENT TO PRACTICE THE INVENTION

The present invention will be more fully understood if the description of the embodiments is read while referring to the drawings.

A several preferred embodiments of the present invention will be described. In the preferred embodiments described below, a space is formed between a shaft and a coil at both ends of a core. In other embodiments, the space may be formed between the shaft and the coil at only one end of the core.

Figure 1:
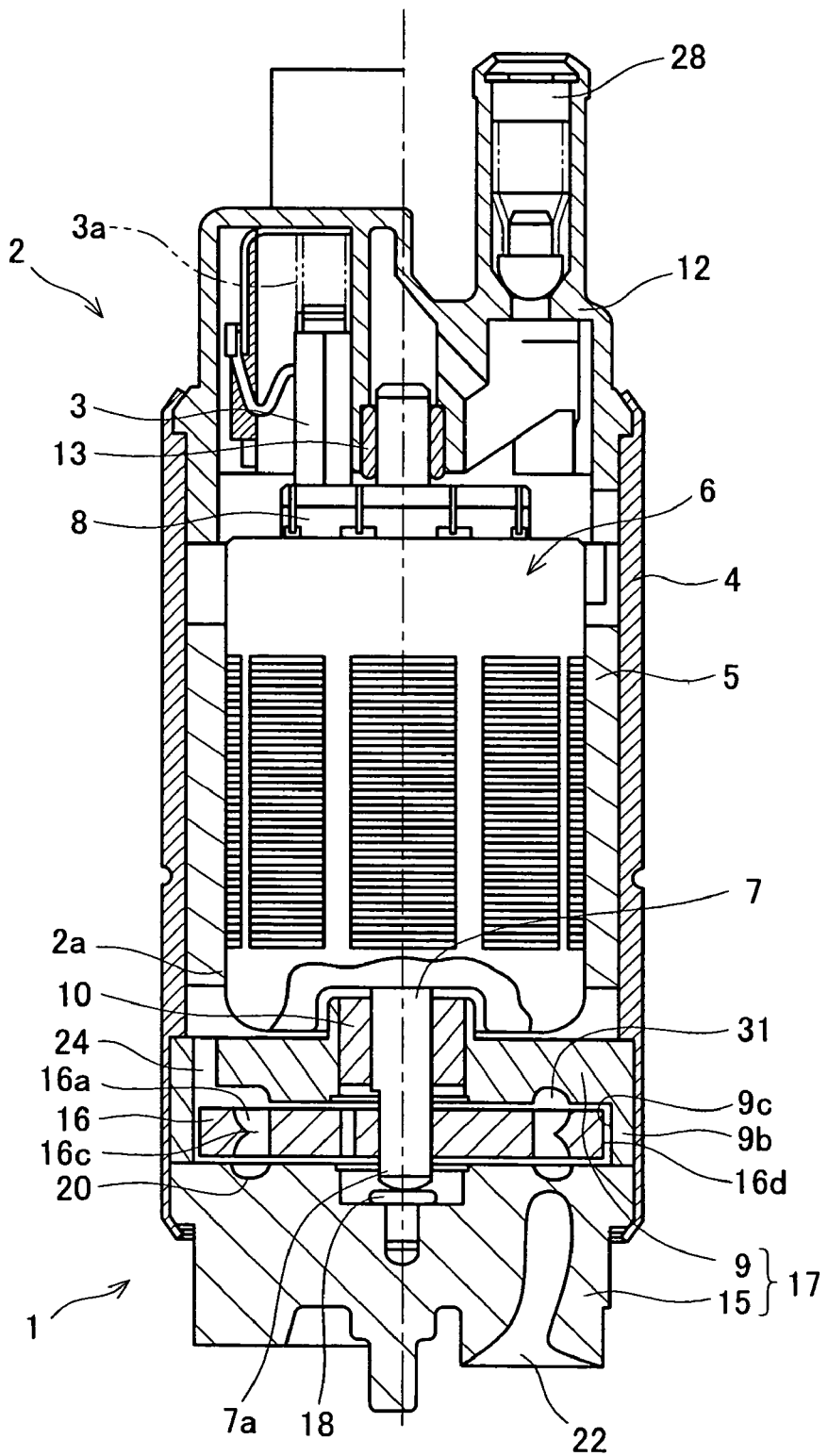
FIG. 1 shows a cross-sectional view of a fuel pump of a first embodiment.

A first embodiment will be described referring to FIGS. 1 to 3. The fuel pump of the present embodiment is used in a motor vehicle, the fuel pump being utilized within a fuel tank and being utilized for supplying fuel to the engine of the motor vehicle. As shown in FIG. 1, the fuel pump is composed of a pump section 1 and a motor section 2.

The configuration of the pump section 1 will be described. The pump section 1 is composed of a pump cover 9, a pump body 15, and an impeller 16, etc. The pump cover 9 and the pump body 15 are formed by, for example, die casting aluminum, and the two are fitted together to form a casing 17 wherein the impeller 16 is housed.

The impeller 16 is formed in substantially a disc shape by means of resin molding. Concavities 16a are formed at both upper and lower faces of the impeller 16. A base portion of each of the upper and lower concavities 16a communicates via a through hole 16c. The concavities 16a form groups of concavities that extend along a circumference direction at a position inwardly offset by a pre-determined distance from an impeller outer circumference face 16d. An outer circumference face 16d of the impeller 16 is a circular face without irregularities.

A fitting shaft member 7a—this being D-shaped in cross-section—at a lower end portion of the shaft 7 fits into a cross-sectionally D-shaped fitting hole formed in the center of the impeller 16. By this means, the impeller 16 is connected with the shaft 7 in a manner allowing follow-up rotation whereby slight movement in the axial direction is allowed.

As shown in FIG. 1, a groove 31 is formed in a lower face of the pump cover 9 in an area opposite the concavities 16a in the upper face of the impeller 16, this groove 31 extending continuously in the direction of rotation of the impeller 16 from an upper flow end to a lower flow end. A discharge hole 24 is formed in the pump cover 9, this discharge hole 24 extending from the lower flow end of the groove 31 to an upper face of the pump cover 9. The discharge hole 24 passes through from the interior to the exterior (an inner space 2a of the motor section 2) of the casing 17.

An inner circumference face 9c of a circumference wall 9b of the pump cover 9 faces, along the entire circumference of this pump cover 9, the impeller outer circumference face 16d, with a minute clearance therebetween. For the sake of clarity, the clearance is represented as larger in the figure than it is in reality.

As shown in FIG. 1, a groove 20 is formed in an upper face of the pump body 15 in an area thereof opposite the concavities 16a in the lower face of the impeller 16. This groove 20 extends continuously along the direction of rotation of the impeller 16 from an upper flow end to a lower flow end. An intake hole 22 is formed in the pump body 15, this intake hole 22 extending from a lower face of the pump body 15 to the upper flow end of the groove 20. The intake hole 22 communicates with the groove 20 within a cross section not shown. The intake hole 22 communicates between the interior and the exterior of the casing 17.

The pump body 15, this being in a superposed state with the pump cover 9, is attached by means of caulking or the like to a lower end portion of the housing 4. A thrust bearing 18 is fixed to a central portion of the pump body 15. The thrust load of the shaft 7 is received by the thrust bearing 18.

In FIG. 1, for the sake of clarity, each clearance is represented as larger than it is in reality.

The groove 31 extending in the circumference direction of the pump cover 9, and the groove 20 extending in the circumference direction of the pump body 15, extend along the direction of rotation of the impeller 16, and extend from the intake hole 22 to the discharge hole 24. When the impeller 16 rotates, the fuel within the fuel tank is drawn into the casing 17 via the intake hole 22. A fuel drawn into the casing 17 flows into the groove 20, the concavities 16a of the impeller 16, and the groove 31. The rotation of the impeller 16 causes a revolving current of the fuel between the lower concavities 16a and the groove 20 and between the upper concavities 16a and the groove 31. The pressure of the fuel rises as it flows along the grooves 20 and 31 from the intake hole 22 to the discharge hole 24.

The pressurized fuel that has flowed along the groove 20 passes through the through holes 16c of the impeller 16 and merges with the pressurized fuel that has flowed along the groove 31. The fuel that has been pressurized is delivered to the motor section 2 through the discharge hole 24. The highly pressurized fuel delivered to the motor section 2 is further delivered to the exterior of the fuel pump from a discharge port 28.

The motor section 2 is composed of a direct current motor provided with an armature 6, a brush 3, and a permanent magnet 5 fixed within the cylindrical housing 4. The armature 6 is provided concentrically with the magnet 5. The brush 3 is pushed by a spring load 3a so as to make contact with a commutator 8.

A lower portion of a shaft 7 of the armature 6 is rotatably supported, via a bearing 10, on the pump cover 9 attached to the lower end portion of the housing 4. Furthermore, an upper end of the shaft 7 is rotatably supported, via a bearing 13, on a motor cover 12 attached to the upper end portion of the housing 4.

In the configuration described above, when voltage is applied to the brush 3 that is connected with an external power source, current flows from the brush 3 to coils 19 (shown in FIG. 2) via the commutator 8, causing the armature 6 to rotate. This rotation of the armature 6 causes the impeller 16 to rotate, drawing the fuel into the fuel pump via the intake hole 22. As stated above, the fuel taken into the fuel pump is pressurized in the pump section 1, and is delivered to the exterior from the discharge port 28.

Figure 2:
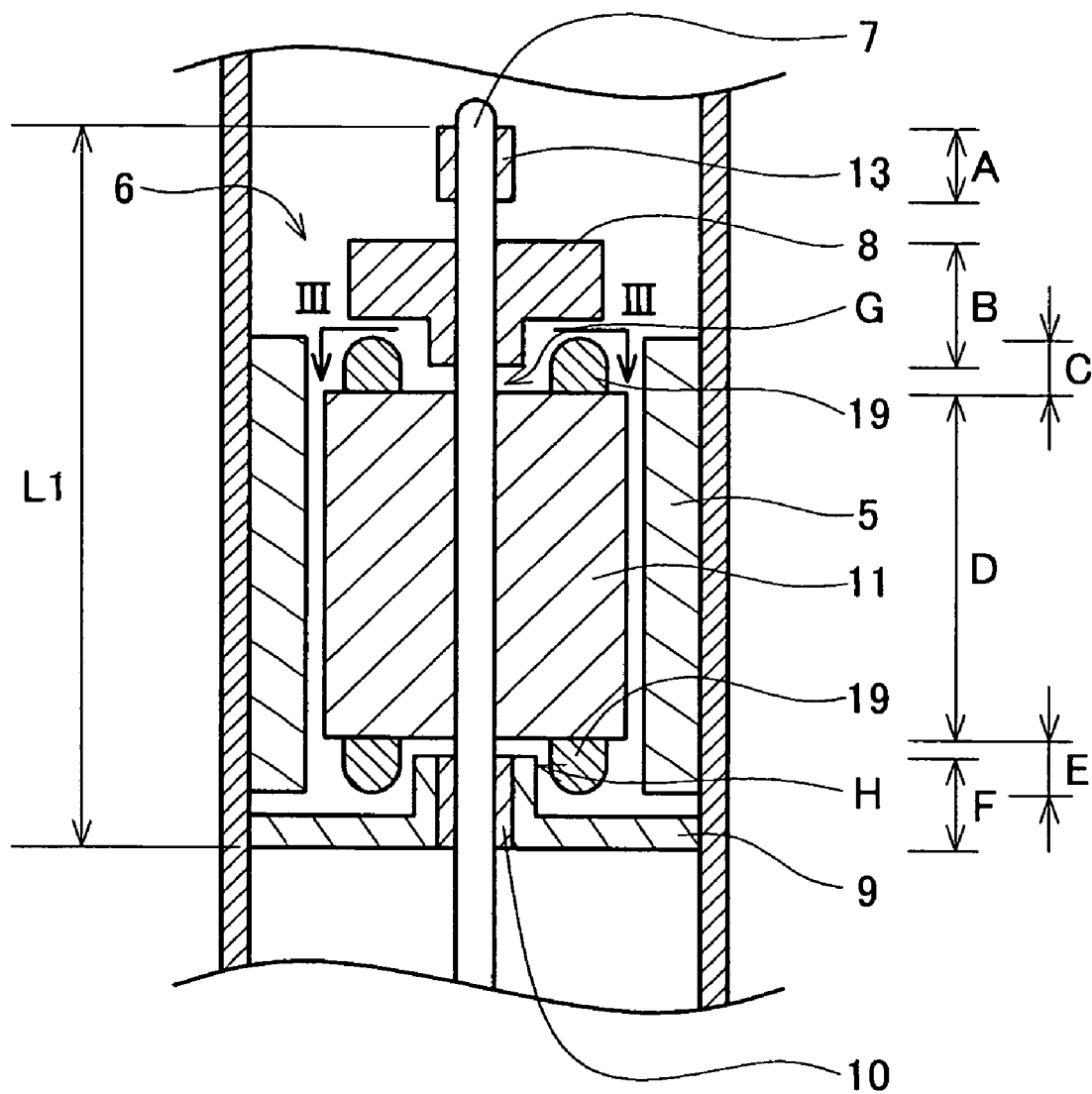
FIG. 2 schematically shows a cross-sectional view of an armature of the first embodiment.
Figure 3:
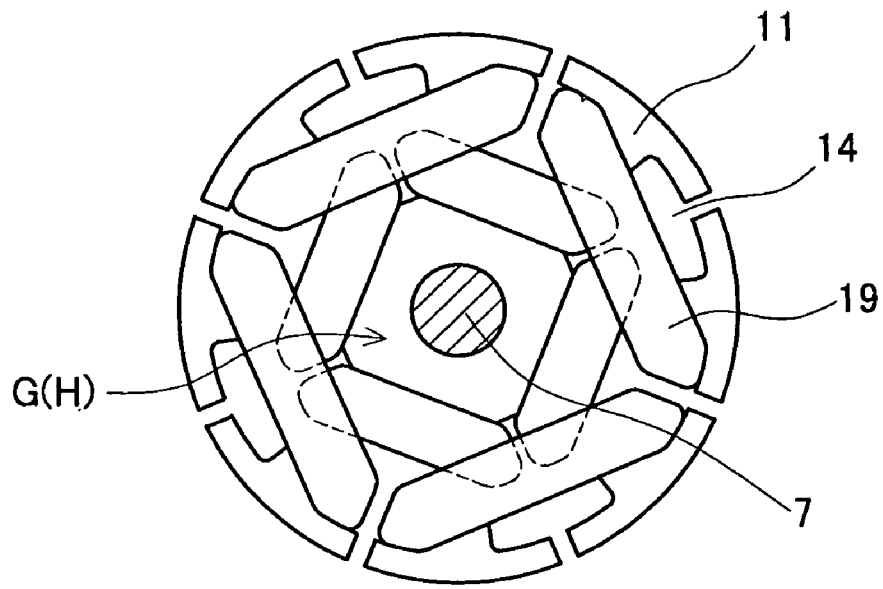
FIG. 3 shows a cross-sectional view along the line III—III of FIG. 2.

FIG. 2 schematically shows a cross-section of the armature 6, and FIG. 3 shows a cross-sectional view along the line III—III of FIG. 2. As shown in FIGS. 2 and 3, the armature 6 is formed from a core 11 consisting of laminated magnetic plates, the coils 19 wound around slots 14 of the core 11, the commutator 8 that supplies current to the coils 19, and the shaft 7 that supports the core 11 and the commutator 8. The core 11 is surrounded by the magnet 5.

The coils 19 are wound around two slots. That is, a coil that has passed a first slot returns to a third slot, and a coil that has passed a second slot returns to a fourth slot. In this specification, when a coil that has passed X-th slot returns to (X+Y)-th slot, this will be referred to as the coil having been wound around Y slots.

Since the coils 19 that have been wound in this manner do not pass near the periphery of the shaft 7, a space G is formed around the shaft 7.

Further, when the coils 19 are wound around two slots 14 at a lower end of the core 11, winding the coils 19 as shown in FIG. 3 forms a space H identical with the space G.

In general, when the coils are wound around no more than one third of the total number of slots, the wound coils do not pass near the periphery of the shaft 7. In this embodiment, the coils are wound around two slots, this being less than one third (2.7) of eight slots. When the coils are wound around no more than one third of the total number of slots, the coils extend in two directions from one slot, the angle formed by these coils being between 90 degrees and 180 degrees. The smaller the angle, the more closely the coil approaches the shaft. Consequently, by winding the coils in the manner described above, it is possible to have the coils in a location separated from the periphery of the shaft, thus allowing a cavity or a space to be formed at the periphery of the shaft 7.

Figure 9:
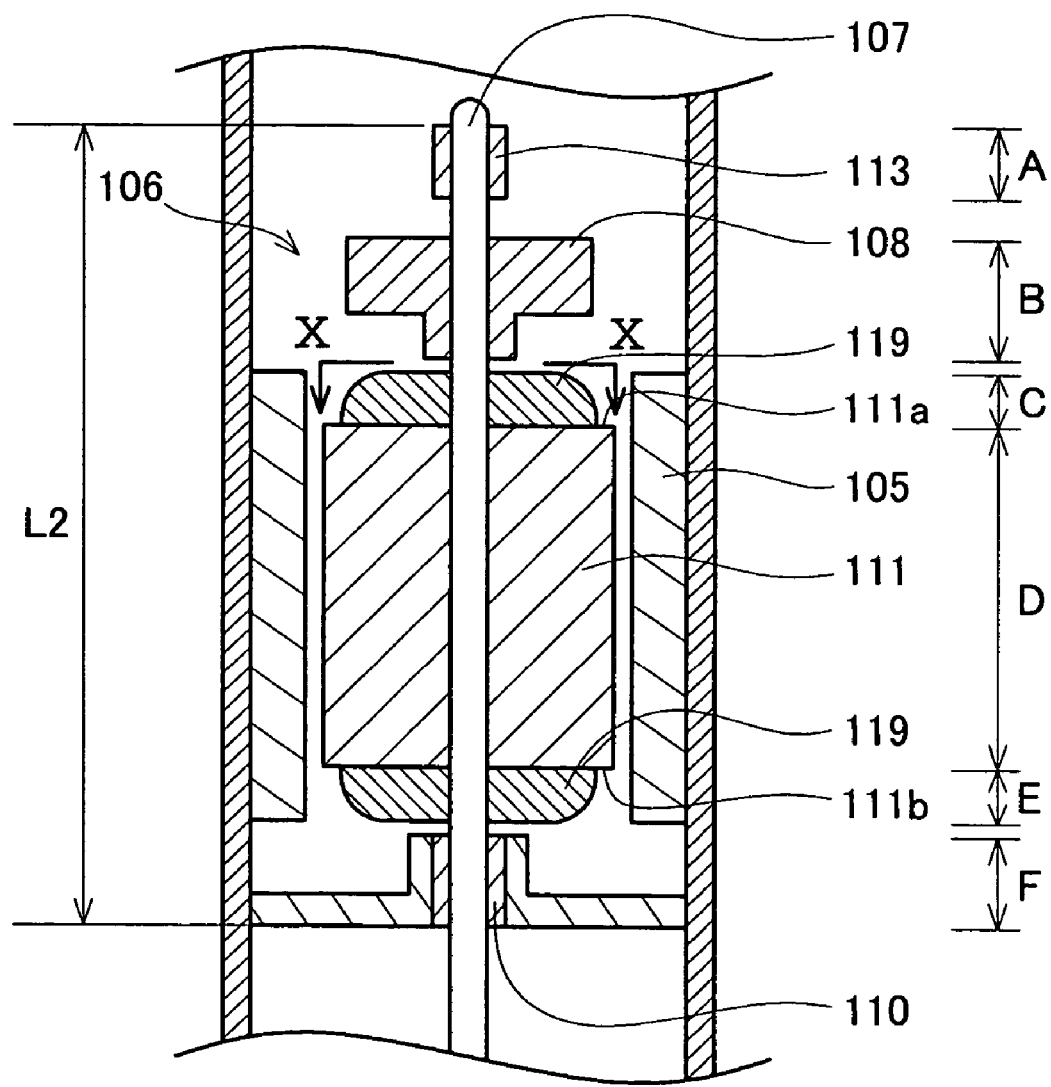
FIG. 9 schematically shows a cross-sectional view of a conventional armature.
Figure 10:
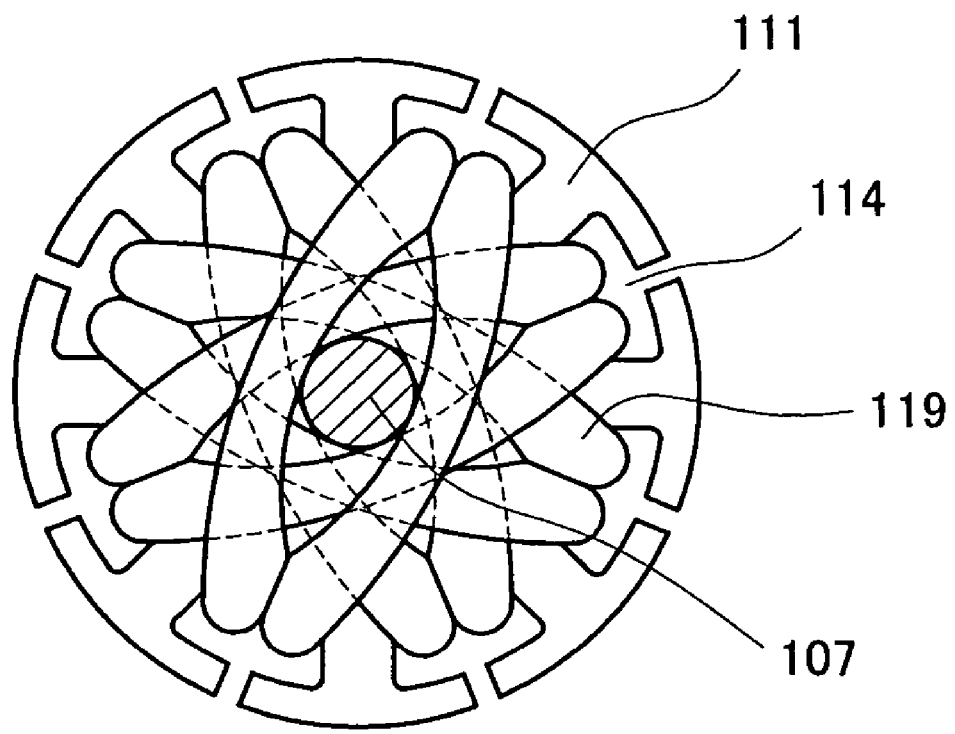
FIG. 10 shows a cross-sectional view along the line X—X of FIG. 9.

In the configuration of the conventional fuel pump shown in FIG. 9, the length L2 between the bearings 113, 110 of the shaft 107 had to be at least [the length A of the upper bearing 113 + the length B of the commutator 108 + the upwardly projecting length C of the coils 119 + the length D of the core 111 + the downwardly projecting length E of the coils 119 + the length F of the lower bearing 110]. The length L2 between the bearings 113 and 110 could not be reduced without reducing the length in the axial direction of the bearings 113 and 110, the commutator 108, or the coils 119.

As shown in FIG. 2, in the fuel pump of the present embodiment, the coils 19 also project in an axial direction from both end faces of the core 11. However, the space G is formed around the shaft 7 at the upper end of the coils 19, and the space H is formed around the shaft 7 at the lower end of the coils 19. A lower portion of the commutator 8 can be inserted into the space G, and an upper portion of the bearing 10 can be inserted into the space H. As a result, a length L1 between the bearings 13, 10 becomes approximately [the length A of the upper bearing 13 + the length B of the commutator 8 + the length D of the core 11 + the length F of the lower bearing 10]. The length B of the commutator 8 and the upwardly projecting length C of the coils 19 are caused to overlap, as are the downwardly projecting length E of the coils 19 and the length F of the lower bearing 10. Consequently, relative to the conventional fuel pump, the length L1 between the bearings 13, 10 can be reduced by the sum of [C+E]. Here C is the upwardly projecting length of the coils 19 and D is the downwardly projecting length of the coils 19. The length L1 between the bearings 13, 10 can be reduced without reducing the length in the axial direction of the bearings 13 and 10, the commutator 8, or the coils 19. As a result, it is possible to reduce the length of the shaft 7, this determining the length in the axial direction of the fuel pump, such that the fuel pump can be miniaturized and made lighter. Pump performance is not reduced even though the fuel pump is miniaturized.

Figure 4:
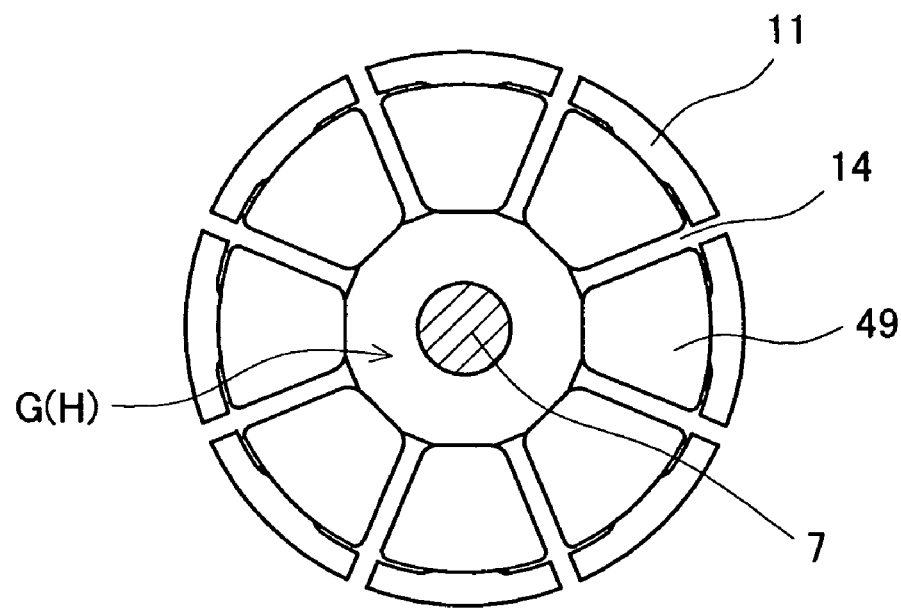
FIG. 4 shows a cross-sectional view of an armature of a second embodiment.

Next, a second embodiment will be described. The fuel pump of the present embodiment differs from the fuel pump of the first embodiment only in the coil portion. Consequently, only the winding of the coils will be described here, and other descriptions will be omitted. FIG. 4 is a cross-sectional view of an armature of the present embodiment at the same location as the line III—III of FIG. 2 used in the first embodiment. Components identical with those of the first embodiment have the same reference numbers assigned thereto.

Coils 49 are wound around one slot. That is, a coil that has passed a first slot returns to a second slot, and a coil that has passed the second slot returns to a third slot. Since the coils 49 that have been wound in this manner do not pass near the periphery of the shaft 7, the space G is formed around the shaft 7. When the coils 49 are wound around one slot 14 at the lower end of the core 11, the space H identical with the space G is also formed.

As with the first embodiment, in the present embodiment, the coils 49 are wound so as to pass around no more than one third of the total number of slots. That is, the coils pass around one slot, this being less than one third (2.7) of eight slots. By this means, the coils 49 can be formed in a location separated from the periphery of the shaft 7, thus allowing a cavity or a space to be formed around the shaft 7. The axial length of the commutator 8 and the upwardly projecting length of the coils 49 can be caused to overlap. Similarly, the downwardly projecting length of the coils 49 and the length of the lower bearing 10 can be caused to overlap. Consequently, the distance between the bearings of the shaft 7 can be reduced without reducing the length in the axial direction of the bearings, the commutator 8, or the coils 49.

Figure 5:
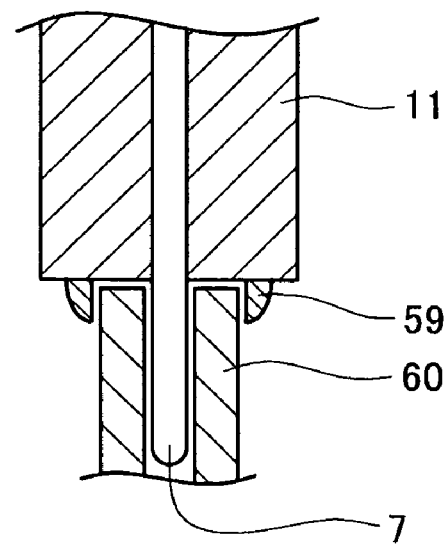
FIG. 5 schematically shows a cross-sectional view of an armature of a third embodiment.
Figure 6:
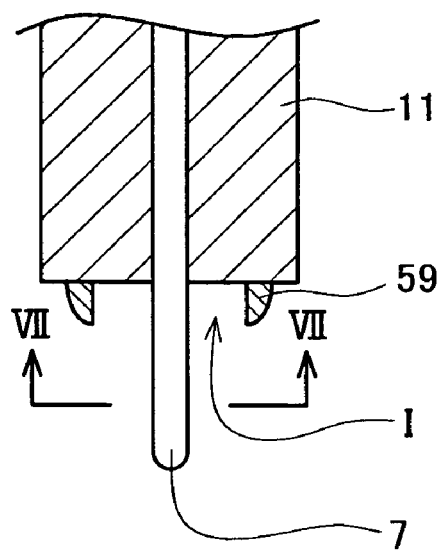
FIG. 6 schematically shows a cross-sectional view of the armature of the third embodiment.
Figure 7:
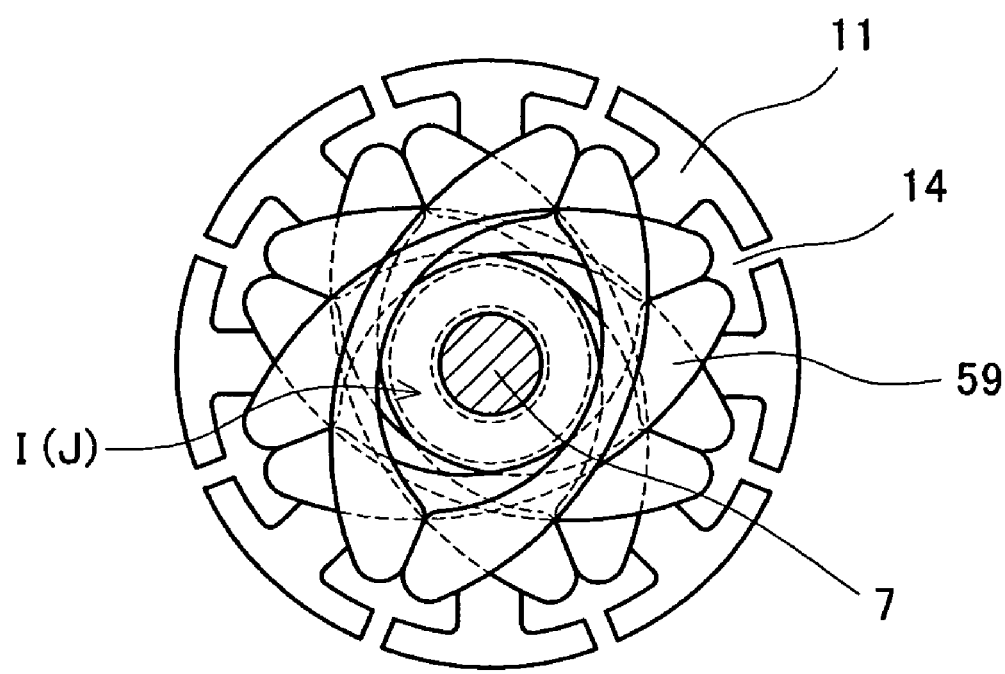
FIG. 7 shows a cross-sectional view along the line VII—VII of FIG. 6.
Figure 8:
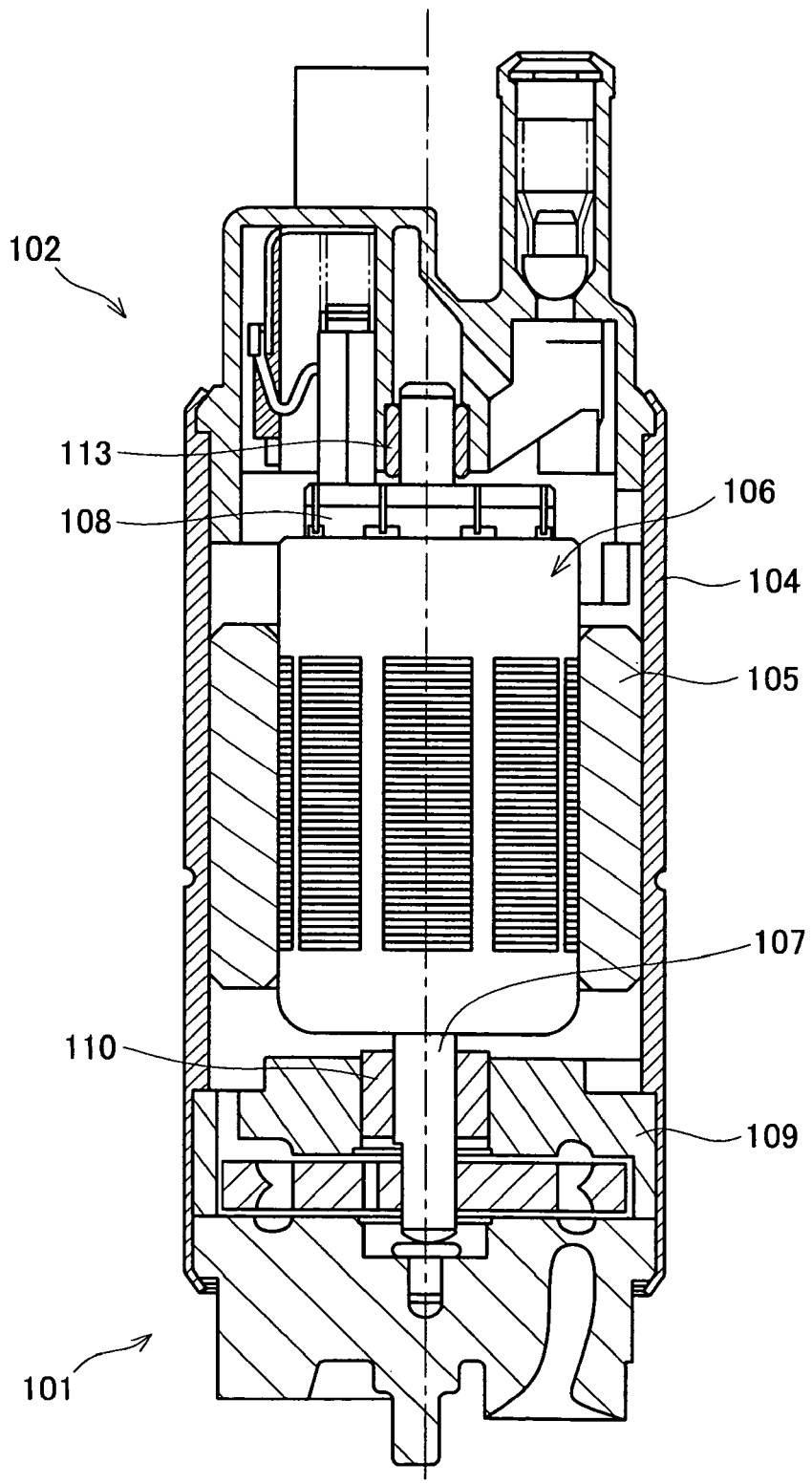
FIG. 8 shows a cross-sectional view of a conventional fuel pump.

Next, a third embodiment will be described referring FIGS. 5 to 7. FIGS. 5 and 6 are partial cross-sectional schematic views of an armature, and FIG. 7 is a cross-sectional view along the line VII—VII of FIG. 6. The fuel pump of the present embodiment differs from the fuel pump of the first embodiment only in the coil portion. Consequently, only the winding of the coils will be described here, and other descriptions will be omitted. Components identical with those of the first embodiment have the same reference numbers assigned thereto.

As shown in FIG. 5, in the process of manufacturing an armature of the present embodiment, a cylindrical jig 60 is utilized at a lower side of the core 11 when the coils 59 are wound around the slots 14 of the core 11. Although not shown in the drawing, similar cylindrical jig 60 is used at an upper side of the core 11. The lower jig 60 is cylindrical and an inner diameter thereof is slightly larger than a diameter of the shaft 7, and an outer diameter thereof is slightly larger than an outer diameter of the lower bearing 10 (see FIG. 1 and FIG. 2). The upper jig 60 is also cylindrical and an inner diameter thereof is slightly larger than the diameter of the shaft 7, and an outer diameter thereof is slightly larger than an outer diameter of the commutator 8 (see FIG. 1 and FIG. 2).

As shown in FIG. 5, the lower jig 60 is passed along the shaft 7 at the lower side of the core 11, and an upper end of the lower jig 60 makes contact with a lower end face of the core 11. Similarly, the upper jig 60 is passed along the shaft 7 at the upper side of the core 11, and a lower end of the upper jig 60 makes contact with an upper end face of the core 11. In this state, the coils 59 are wound. The pair of jigs 60 is removed after the coils 59 have been wound, as shown in FIG. 6.

FIG. 7 is a cross-sectional view along the line VII—VII of FIG. 6. As shown in FIG. 7, the coils 59 are wound avoiding the jig 60 and consequently a space I is formed around the shaft 7 at the lower side of the core 11 after the lower jig 60 has been removed. The space I is formed between the shaft 7 and coil portions projecting from the core 11. Further, a space J identical with the space I is formed around the shaft 7 at the upper side of the core 11. The space J is formed between the shaft 7 and coil portions projecting from the core 11. When the armature is produced by this method, there is no restriction on the number of slots that the coils 59 pass around.

In the present embodiment, the coils 59 also project in the axial direction from both end faces of the core 11. However, the spaces I and J are left around the shaft 7. The spaces I and J are formed between the shaft 7 and coil portions projecting from the core 11. The lower portion of the commutator 8 can be inserted into the space J, and the upper portion of the bearing 10 can be inserted into the space I. As a result, the axial length of the commutator 8 and the upwardly projecting length of the coils 59 are caused to overlap, as are the downwardly projecting length of the coils 59 and the length of the lower bearing 10. As a result, the length between the bearings of the shaft 7 becomes [the length of the upper bearing 13 + the length of the commutator 8 + the length of the core 11 + the length of the lower bearing 10]. That is, relative to the conventional fuel pump, the length of the fuel pump can be reduced by the extent of the projecting length of the coils 59. It is possible to reduce the distance between the bearings of the shaft 7 without reducing the length in the axial direction of the bearings 13 and 10, the commutator 8, or the coils 59. As a result, the fuel pump can be miniaturized without reducing pump performance.

Specific examples of the present invention are presented above, but these merely illustrate some possibilities of the invention and do not restrict the claims thereof. The art set forth in the claims includes various transformations and modifications to the specific examples set forth above. For example, the length of the upper bearing and the upwardly projecting length of the coils can be caused to overlap by changing the position of the commutator.

Furthermore, the technical elements disclosed in the present specification or drawings may be utilized separately or in all types of conjunctions and are not limited to the conjunctions set forth in the claims at the time of submission of the application. Furthermore, the art disclosed in the present specification or drawings may be utilized to simultaneously realize a plurality of aims or to realize one of these aims.

The invention claimed is:

1. A method for producing an armature having a shaft, a core fixed to the shaft, coils wound around the core, and a commutator, wherein the axial end portions of the coils project from an axial end face of the core, and a space is provided between the projecting portions of the coils and the shaft at least at one axial end of the core, the method comprising the steps of:
    fixing the core to the shaft;
    covering at least one end portion of the shaft projecting from the core with a cylindrical jig such that an end of the cylindrical jig makes contact with an end face of the core when the coils are wound around the core; and
    removing the jig from the shaft.

2. A method as defined in claim 1, wherein an outer diameter of the cylindrical jig is larger than an outer diameter of the commutator.

* * * * *